United States Patent
Huang

(10) Patent No.: US 10,245,999 B2
(45) Date of Patent: Apr. 2, 2019

(54) HEADLIGHT WITH A MODULAR PROJECTION MODULE FOR ENHANCING ILLUMINATION INTENSITY

(71) Applicant: Yujing Technology Co., Ltd., New Taipei (TW)

(72) Inventor: Cheng-Feng Huang, New Taipei (TW)

(73) Assignee: YUJING TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/170,351

(22) Filed: Oct. 25, 2018

(65) Prior Publication Data
US 2019/0061600 A1 Feb. 28, 2019

Related U.S. Application Data

(63) Continuation-in-part of application No. 15/457,875, filed on Mar. 13, 2017, now abandoned.

(51) Int. Cl.
| | |
|---|---|
| *B60Q 1/00* | (2006.01) |
| *F21S 41/143* | (2018.01) |
| *B60Q 1/04* | (2006.01) |
| *F21S 41/19* | (2018.01) |
| *F21S 41/255* | (2018.01) |

(Continued)

(52) U.S. Cl.
CPC ............. *B60Q 1/0011* (2013.01); *B60Q 1/04* (2013.01); *F21S 41/192* (2018.01); *F21S 41/255* (2018.01); *F21S 41/295* (2018.01); *F21S 41/321* (2018.01); *F21S 41/39* (2018.01); *F21S 41/47* (2018.01); *F21S 43/14* (2018.01);

(Continued)

(58) Field of Classification Search
CPC ....... B60Q 1/0011; B60Q 1/04; F21V 29/763; F21V 29/89; F21S 43/14; F21S 45/49; F21S 41/255; F21S 41/192; F21S 41/321; F21S 41/39; F21S 41/295; F21S 41/47; F21S 41/365
See application file for complete search history.

(56) References Cited

U.S. PATENT DOCUMENTS

| | | | |
|---|---|---|---|
| 7,722,232 B2 * | 5/2010 | Nakada | F21S 41/147 362/507 |
| 8,348,486 B2 * | 1/2013 | Nakada | F21S 41/147 362/538 |

(Continued)

*Primary Examiner* — Anh T Mai
*Assistant Examiner* — Arman B Fallahkhair
(74) *Attorney, Agent, or Firm* — Lynette Wylie; Apex Juris, pllc

(57) ABSTRACT

A headlight with a modular projection module for enhancing illumination intensity includes a base, a lighting module, a reflective cover, a light-shielding member and a lens assembly. The base has a connection portion obliquely formed on a top of the base. The lighting module is mounted on the connection portion of the base. The reflective cover is mounted on the connection portion of the base with an inner reflective surface facing the lighting module. The lens assembly is mounted on a front portion of the base. The light-shielding member is mounted on a rear portion of the lens assembly. As the lighting module is located below a horizontal center line of the lens assembly and the connection portion of the base is obliquely arranged, the reflective cover can significantly reflect light emitted from the lighting module to enhance illumination intensity of the headlight.

12 Claims, 13 Drawing Sheets

(51) Int. Cl.
*F21S 41/29* (2018.01)
*F21S 41/32* (2018.01)
*F21S 41/47* (2018.01)
*F21S 43/14* (2018.01)
*F21S 45/49* (2018.01)
*F21V 29/76* (2015.01)
*F21V 29/89* (2015.01)
*F21S 41/39* (2018.01)
*F21S 41/365* (2018.01)

(52) U.S. Cl.
CPC ............ *F21S 45/49* (2018.01); *F21V 29/763* (2015.01); *F21V 29/89* (2015.01); *F21S 41/365* (2018.01)

(56) References Cited

U.S. PATENT DOCUMENTS

| | | | |
|---|---|---|---|
| 9,671,079 B2* | 6/2017 | Honda | F21V 13/04 |
| 10,024,514 B2* | 7/2018 | Kanayama | F21S 41/143 |
| 2010/0118559 A1* | 5/2010 | Nakada | F21S 41/147 |
| | | | 362/539 |
| 2017/0023203 A1* | 1/2017 | Sagisaka | F21S 41/29 |
| 2018/0142858 A1* | 5/2018 | Huang | F21S 41/192 |

* cited by examiner

HEADLIGHT WITH A MODULAR PROJECTION MODULE FOR ENHANCING ILLUMINATION INTENSITY

CROSS-REFERENCE TO RELATED APPLICATIONS

This application is a continuation-in-part (CIP) application of U.S. application Ser. No. 15/457,875, filed on Mar. 13, 2017, the disclosures of which are incorporated herein in their entirety by reference.

BACKGROUND OF THE INVENTION

1. Field of the Invention

The present invention relates to a headlight and, more particularly, to a headlight with a modular projection module for enhancing illumination intensity.

2. Description of the Related Art

For the concern of driving safety at night, vehicles are usually equipped with headlights to provide better level of nighttime visibility for drivers to have clear view out of the front of the vehicles.

With reference to FIG. 9, a conventional headlight includes a vertical center line VC and a horizontal center line HC. As far as right-hand traffic is concerned, a point A on the right of the vertical center line VC indicates a light source on the right, a point B on the left of the vertical center line VC represents a light source on the left, a first ellipse C1 represents a range with a highest luminance, a second ellipse C2 outside the first ellipse C1 represents a range with a second highest luminance, and an outermost third ellipse C3 represents a range with a weakest luminance. As can be seen, top and bottom portions above and below the horizontal center line HC are both luminescent. When two cars drive toward each other, light above the horizontal center line HC generates headlight glare toward the oncoming car, which affects the visibility of the driver in the oncoming car.

To avoid the foregoing danger caused by the glare effect, with reference to FIG. 10, another conventional headlight 80 includes a transparent cover 81, an LED lighting element 82, a reflector 83 and a light-shielding board 84. The transparent cover 81 has a center line CL. The transparent cover 81 is a plano-convex lens in this case and the center line CL is an optical axis of the transparent cover 81. The LED lighting element 82 is mounted above the center line CL. The reflector 83 is also mounted above the center line CL and has a reflective surface facing the LED lighting element 82. The light-shielding board 84 is mounted under a focal point F of the transparent cover 81 with a top edge thereof contacting the focal point F. Most of light emitted from the LED lighting element 82 is reflected toward a lower portion of the transparent cover 81 and only a small part of light emitted from the LED lighting element 82 and reflected to the top edge of the light-shielding board 84 is projected to an upper portion of the transparent cover 81. Therefore, light transmitted to the upper portion of the transparent cover 81 is significantly blocked. With reference to FIG. 9 or 10, an illumination pattern of the conventional headlight 80 has a cut-off line (COL), below which light from the conventional headlight 80 can be observed and above which it cannot. FIGS. 11 and 12 represent the illumination patterns of headlights specified in US motor vehicle regulations and European motor vehicle regulations respectively. As US and most countries in Europe pertain to right-hand traffic, an upper luminescent portion is present above the horizontal center line HC and on the right side of the vertical center line VC. As a result, different illumination patterns are asymmetrically formed on the right side and on the left side of the vertical center line VC. The upper luminescent portion is intended to give clear visibility of road signs on the right of the vehicle. Given the light-shielding member 84 for blocking light transmitted to the upper portion of the transparent cover 81, the illumination pattern of the conventional headlight 80 has a distinct COL, ensuring a reduced illumination intensity of the portion above the horizontal center line HC for improving the issue of glare generated by headlight toward the oncoming car.

However, as the LED lighting element 82 and the reflector 83 of the conventional headlight 80 are both mounted above the center line CL and the LED lighting element 82 only faces an upper portion of the reflector 83, only a small part of a reflective surface of the reflector 83 is utilized to reflect light emitted from the LED lighting element 82 and such ineffective reflection weakens the illumination intensity of the conventional headlight 80 and fails to provide sufficient illumination intensity for nighttime driving.

Further to the reduction of glare generated by headlight toward the oncoming car, regulations demand for lower luminous intensity of passing beams at certain light regions where are located to the left of the vertical center line VC, under the horizontal center line HC, and below the COL. One of the examples is the light regions situated at 50 L associated with European requirements, which is defined to be 0.86 degrees below the HC and 3.43 degrees to the left of the VC or 0.86 degrees below the HC and 3.5 degrees to the left of the VC associated with American requirements. Some conventional headlights may employ the light-shielding boards similar to that in FIG. 10 except a blocking fence formed on and protruding upwards from a top right edge of the light-shielding boards and located above the focal point so as to block the passing beams irradiated to the light region. With reference to FIG. 13, however, as a result of the blockage of the blocking fence, an illumination pattern of the headlights may be shown with a notched and discontinued COL, indicating that a dark zone over the notched area of the COL is generated with the likelihood of endangering the driving safety.

SUMMARY OF THE INVENTION

An objective of the present invention is to provide a headlight with a modular projection module for enhancing illumination intensity, which significantly reflects light emitted from a lighting module to decrease light output to a light region centered at 50 L in a left half portion of an illumination pattern associated with lower beam of the headlight and increase light output to a light region striding across the left half portion and a right half portion of the illumination pattern.

To achieve the foregoing objective, the headlight with a modular projection module for enhancing illumination intensity includes a base, a lighting module, a support frame, a reflective cover, a lens assembly, and a light-shielding member.

The base has a connection portion formed on and protruding obliquely downwards and rearwards from a middle portion of the base.

The lighting module is mounted on a top of the connection portion of the base.

The support frame is mounted on a front portion of the base and has an opening formed through the support frame.

The reflective cover is mounted on the top of the connection portion of the base with a front portion of the reflective cover mounted through the opening of the support frame, and has a first reflective surface concavely formed on an inner wall of the reflective cover and facing the lighting module.

The lens assembly is mounted on a front portion of the support frame and has a center line centrally passing through the lens assembly. The center line is an optical axis of the lens and the lighting module is located below the center line of the lens assembly.

The light-shielding member is mounted between the lens assembly and the support frame and has a blocking wall, a blocking ear, and a reflective block.

The blocking wall is formed on and protrudes upwards from a top edge portion of a right half part of the light-shielding member, and is located above the center line.

The blocking ear is formed on and horizontally protrudes rearwards from a portion of a rear surface of the blocking wall which is adjacent to a left end of the blocking wall and is located above the center line.

The reflective block is formed on and obliquely protrudes downwards and rearwards from the rear surface of the light-shielding member, is located below the blocking ear, and has a second reflective surface concavely formed on a rear portion of the reflective block and facing the first reflective surface of the reflective cover.

A vertical plane and a horizontal plane perpendicularly intersect in the center line. Light emitted from the lighting module is reflected by the reflective cover, is partially blocked and partially reflected by the light-shielding member, and passes through the lens assembly to generate an illumination pattern associated with lower beam for right hand traffic.

The illumination pattern includes a left half pattern, a right pattern, a passing-beam dimming zone, and a brightened region.

The left half pattern and the right half pattern are located below the horizontal plane and are divided by the vertical plane. The left half pattern is lower than the right half pattern.

The passing-beam dimming zone is located in the left half pattern and is defined to be an area 0.86 degrees below the horizontal plane and 3.5 degrees to the left of the vertical plane. A part of light emitted from the lighting module and irradiating to the blocking ear is blocked by the blocking ear of the light-shielding member to prevent the part of light from further irradiating to the lens assembly and cause a reduced luminous intensity at the passing-beam dimming zone.

The brightened region stretches across the vertical plane and is divided by the vertical plane to have a left part and a right part.

The left part is located on the left of the vertical plane, extends downwards from a top edge portion of the left half pattern and leftwards from the vertical plane, and is spaced apart from the passing-beam dimming zone by a gap.

The right part extends rightwards from the vertical plane with a left top portion thereof coinciding to a left edge portion of the right half pattern of the illumination pattern.

A part of light emitted from the lighting module and irradiating to the second reflective surface of the reflective block is sequentially reflected by the second reflective surface and the first reflective surface of the reflective cover and the reflected light further irradiates to pass through the lens assembly to cause an increased luminous intensity at the brightened region.

According to the foregoing structure of the headlight, as the connection portion of the base is obliquely formed, the lighting module mounted on the connection portion therefore faces the reflective surface of the reflective cover. Besides, because the lighting module is located below a horizontal center line of the lens assembly, light emitted from the lighting module is significantly reflected by the reflective surface of the reflective cover and is then transmitted out through the lens assembly, thereby effectively utilizing light emitted from the lighting module and enhancing light output of the headlight.

Additionally, owing to the blockage of the blocking ear, the passing-beam dimming zone centered at 50 L has a reduced luminous intensity because less amount of light that is emitted from the lighting module can reach the passing-beam dimming zone. On the other hand, because of the presence of the second reflective surface of the reflective block, more amount of light can be reflected to irradiate to and pass through the lens assembly to increase the luminous intensity at the brightened region. As the reflective block is integrally formed on the rear portion of the light-shielding member, the luminous intensity at the brightened region can be increased at no cost for extra element.

Other objectives, advantages and novel features of the invention will become more apparent from the following detailed description when taken in conjunction with the accompanying drawings.

DETAILED DESCRIPTION OF THE INVENTION

Figure 1:
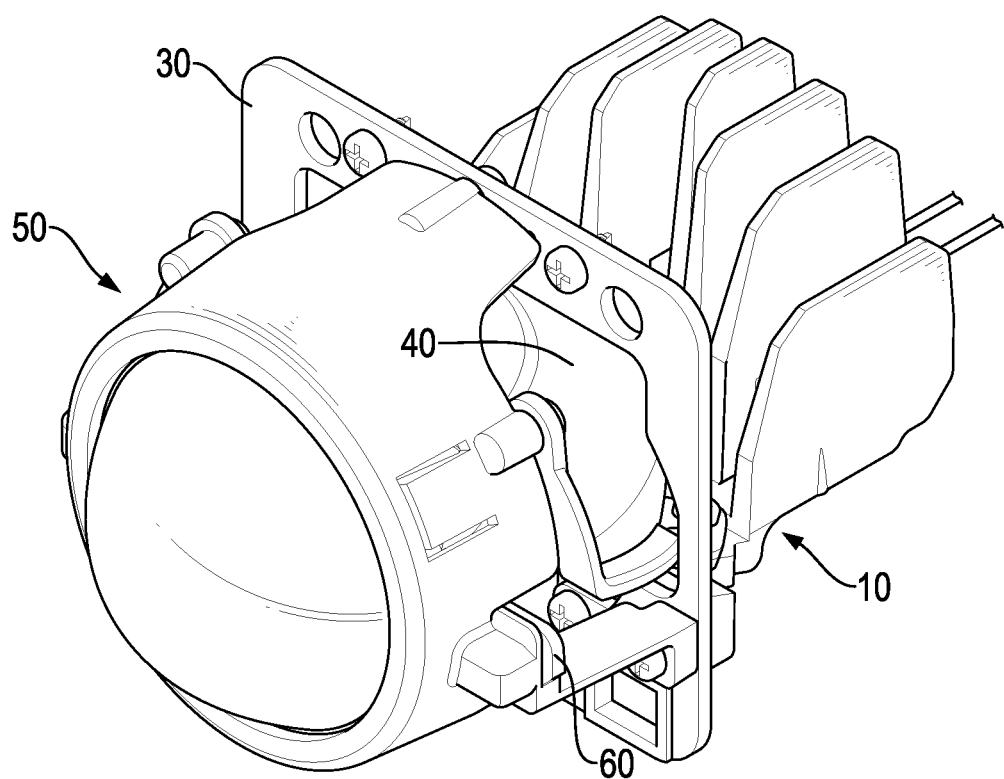
FIG. 1 is a perspective view of a headlight with a modular projection module for enhancing illumination intensity in accordance with the present invention.
Figure 2:
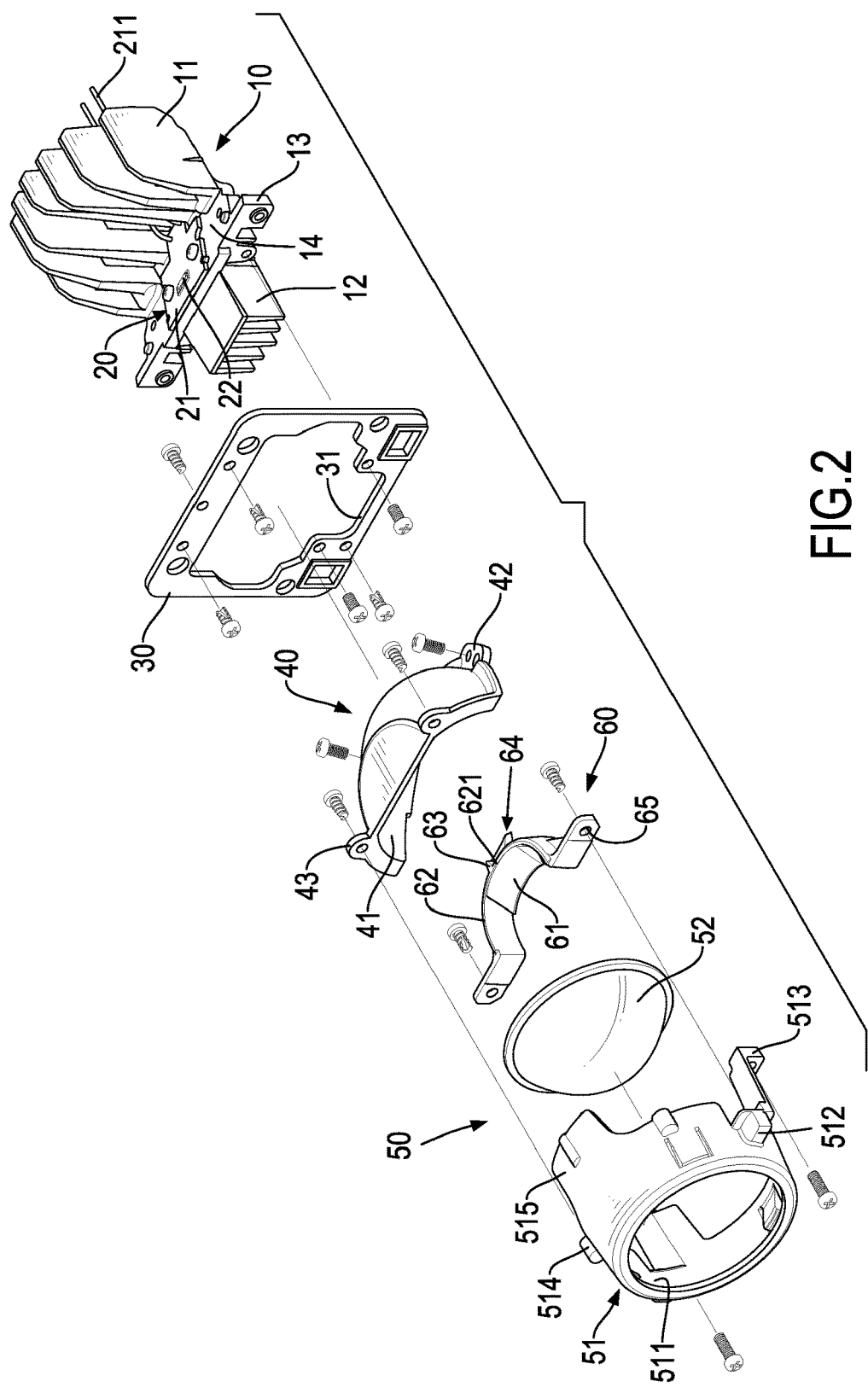
FIG. 2 is an exploded perspective view of the headlight in FIG. 1.

With reference to FIGS. 1 and 2, a headlight with a modular projection module for enhancing illumination intensity in accordance with the present invention includes a base 10, a lighting module 20, a support frame 30, a reflective cover 40, a lens assembly 50 and a light-shielding member 60. The reflective cover 40, the lens assembly 50 and the light-shielding member 60 as a whole constitutes a projection module.

Figure 3:
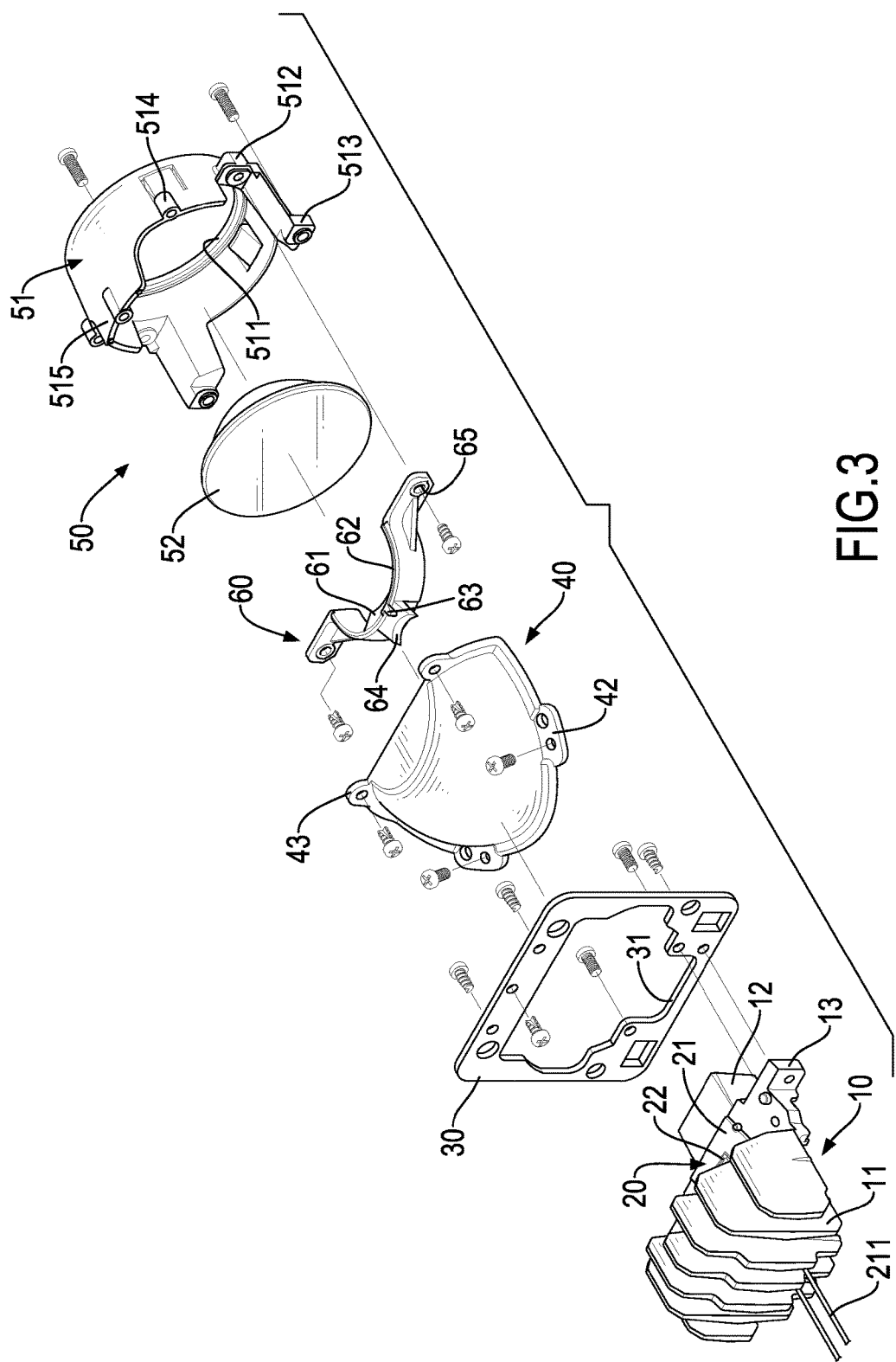
FIG. 3 is another exploded perspective view of the headlight in FIG. 1.

With reference to FIGS. 2 and 3, the base 10 has a connection portion 14, a first heat-dissipating portion 11, a second heat-dissipating portion 12 and two first coupling portions 13.

The connection portion 14 is formed on and protrudes obliquely downwards and rearwards from a middle portion of the base 10 and has multiple threaded holes formed in a top of the connection portion 14. The first heat-dissipating portion 11 is formed on a rear portion of the connection portion 14, has multiple fins formed thereon and arranged at spaced intervals, and is made of an aluminum material. The second heat-dissipating portion 12 is formed on a front portion of the connection portion 14, has multiple fins formed thereon and arranged at spaced intervals, and is made of an aluminum material. The two first coupling portions 13 are formed on and protrude outwards from a left side and a right side of the connection portion 14, and each first coupling portion 13 has multiple threaded holes formed therein.

The lighting module 20 is mounted on the top of the connection portion 14 of the base 10 and has a substrate 21 and a light-emitting element 22. The substrate 21 has two power wires 211 formed thereon and connected to a positive electrode and a negative electrode of an external power source. The light-emitting element 22 is formed on a top of the substrate 21. In the present embodiment, the substrate 21 is made of an aluminum material and the light-emitting element 22 is composed of one or multiple light-emitting diodes (LEDs). The substrate 21 further has two through holes formed through the substrate 21 to correspond to the respective threaded holes of the connection portion 14 of the base 10, and two fasteners are respectively sequentially mounted through the through holes of the substrate 21 and the corresponding threaded holes of the connection portion 14 to fasten the substrate 21 on the connection portion 14 of the base 10.

The support frame 30 is mounted around the second heat-dissipating portion 12 and is mounted on the first coupling portions 13 of the base 10, and has an opening 31 and multiple bordering holes. The opening 31 is formed through a central portion of the support frame 30. The multiple bordering holes are formed through an edge portion around the opening 31. Two of the multiple bordering holes respectively correspond to one of the threaded holes formed in one of the first coupling portions 13 of the base 10 and one of the threaded holes formed in the other first coupling portion 13 of the base 10, and two fasteners are sequentially mounted through the two bordering holes and the corresponding threaded holes on the first coupling portions 13 to fasten the support frame 30 on the base 10.

The reflective cover 40 is mounted on the top of the connection portion 14 of the base 10 and a front portion of the reflective cover 40 is mounted through the opening 31 of the support frame 30, and has a first reflective surface 41 concavely formed on an inner wall of the reflective cover 40 and facing the lighting module 20. The reflective cover 40 further has two second coupling portions 42 formed in a rear edge portion of the reflective cover 40 and corresponding to two of the multiple threaded holes on the top of the connection portion 14 of the base 10. Two fasteners are respectively sequentially mounted through the two second coupling portions 42 and the two corresponding threaded holes on the connection portion 14 to fasten the reflective cover 40 on the base 10.

The lens assembly 50 is mounted on a front portion of the support frame 30 and has a lens housing 51 and a lens 52. The lens housing 51 has a lens-mounting hole 511 formed through the lens housing 51. The lens 52 is mounted in the lens-mounting hole 511 with a front portion of the lens 52 protruding frontwards beyond the lens-mounting hole 511. In the present embodiment, the lens housing 51 further has two third coupling portions 512 and two fourth coupling portions 513. The two third coupling portions 512 are formed on a left portion and a right portion of a periphery of the lens housing 51 and are securely connected with the light-shielding member 60. The fourth coupling portions 513 are formed on and protrude rearwards from rear portions of the respective third coupling portions 512, and correspond to a rightmost bordering hole and a leftmost bordering hole on a bottom edge portion of the support frame 30 and a rightmost threaded hole and a leftmost threaded hole on the first coupling portion 13. Two fasteners are sequentially mounted through the corresponding fourth coupling portions 513, the corresponding bordering holes of the support frame 30, and the corresponding threaded holes of the first coupling portion 13 of the base 10 to fasten the lens assembly 50, the support frame 30 and the base 10 together.

The lens housing 51 further has two fifth coupling portions 514 formed on a top portion of the lens housing 51. The reflective cover 40 has two sixth coupling portions 43 formed on a top portion of the reflective cover 40. The fifth coupling portions 514 correspond to two bordering holes on a top edge portion of the support frame 30 and the sixth coupling portions 43 of the reflective cover 40 respectively. Two fasteners are sequentially respectively mounted through the fifth coupling portions 514, the corresponding bordering holes and the sixth coupling portions 43 to fasten the lens assembly 50, the reflective cover 40 and the support frame 30 together.

The lens housing 51 further has a seventh coupling portion 515 formed on the top portion thereof and corresponding to one of the bordering holes centrally located on the top edge portion of support frame 30. A fastener is sequentially mounted through the seventh coupling portion 515 and the corresponding border hole to fasten the lens housing 51 and the support frame together 30.

Figure 6:
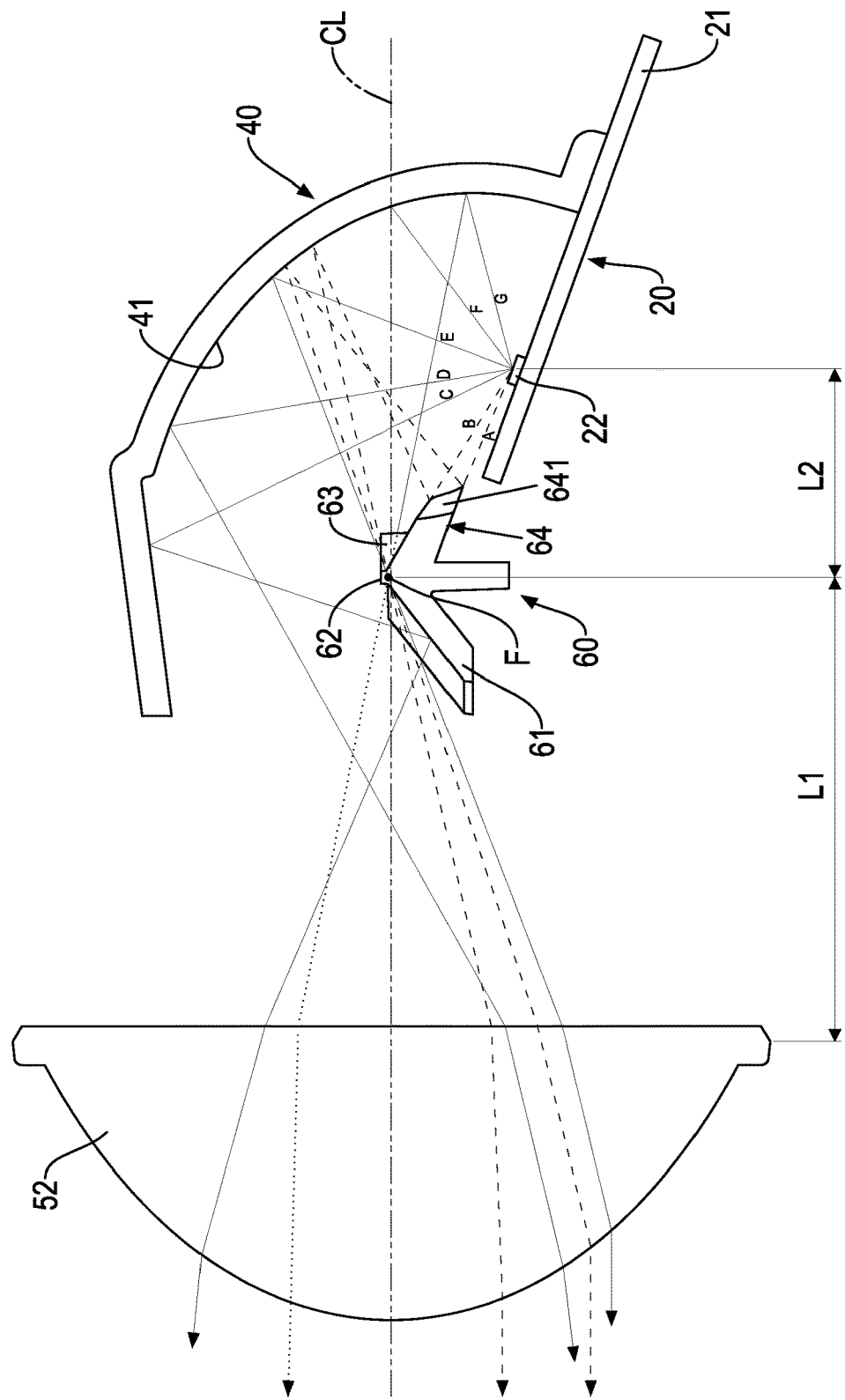
FIG. 6 is a schematic side view showing light transmission of the headlight in FIG. 1.

The lens 52 includes but is not limited to a double convex lens or a plano-convex lens with a convex front side and a flat rear side. With reference to FIG. 6, the lens 52 has a center line CL centrally passing through the lens 52. The center line CL is an optical axis of the lens 52. The light-emitting element 22 is mounted below the center line CL of the lens 52.

Figure 4:
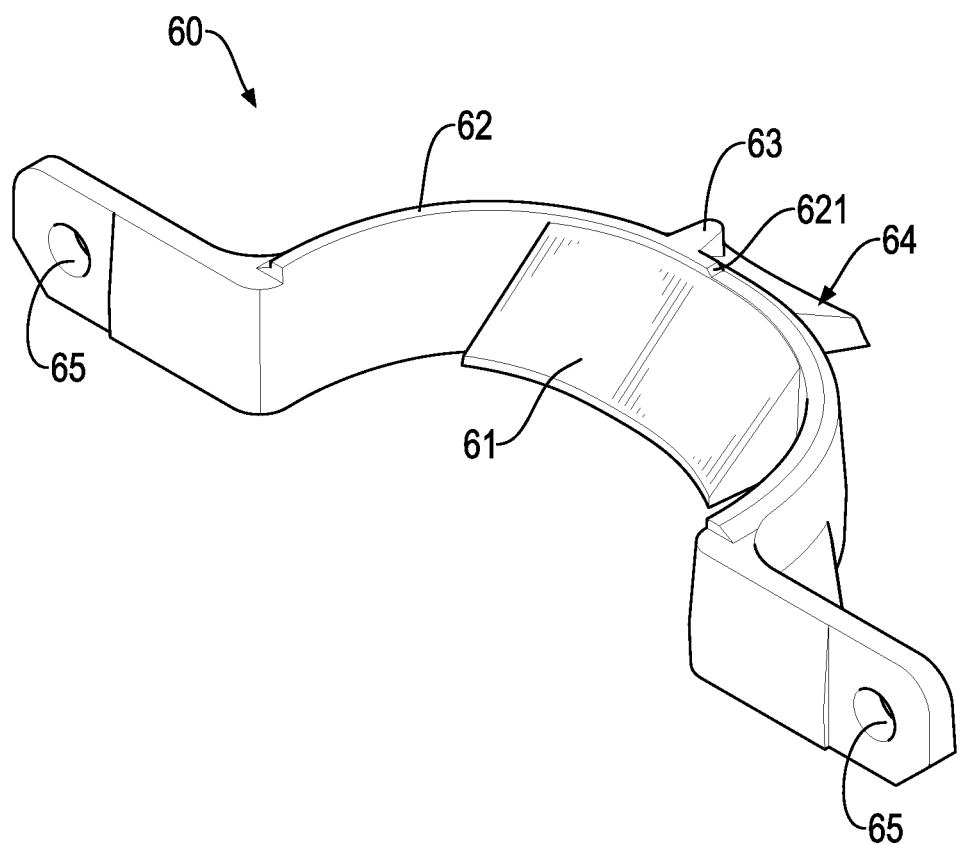
FIG. 4 is an enlarged perspective view of a light-shielding member of the headlight in FIG. 2.
Figure 5:
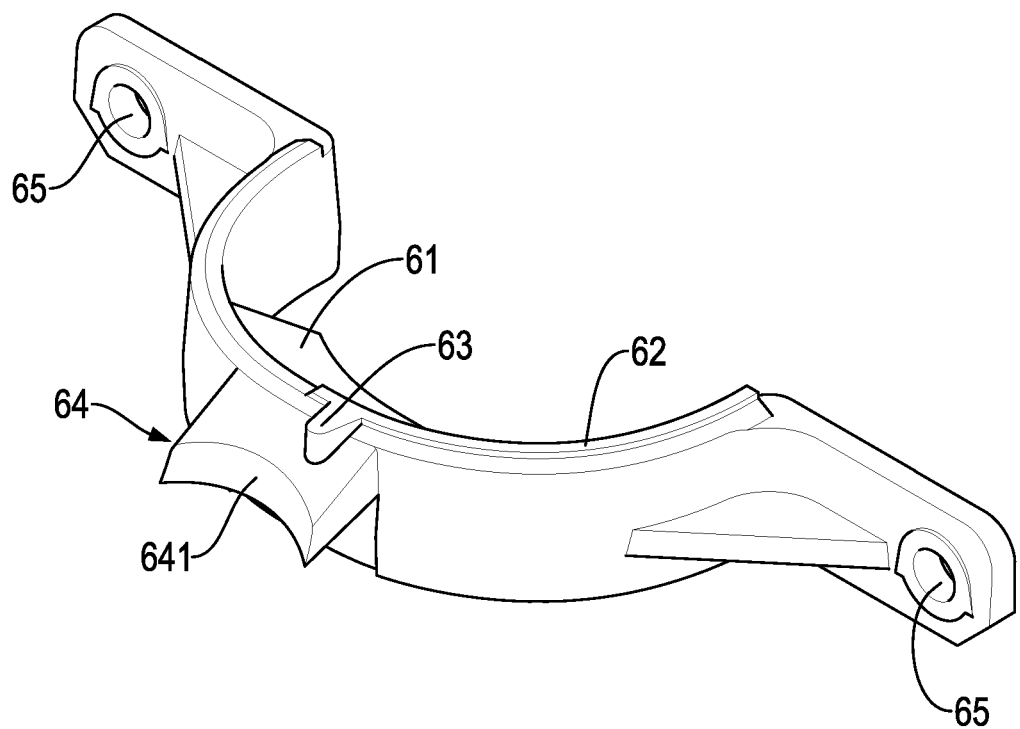
FIG. 5 is another perspective view of the light-shielding member in FIG. 4.

With further reference to FIGS. 2 and 3, the light-shielding member 60 is mounted between the lens assembly 50 and the support frame 30. With reference to FIGS. 4 and 5, the light-shielding member 60 is Q-shaped and has a slanted portion 61, a blocking wall 62, a blocking ear 63, a reflective block 64, and two mounting holes 65. The slanted portion 61 is formed on and obliquely protrudes forwards and downwards from a central portion of a front surface of the light-shielding member 60. The blocking wall 62 is formed on and protrudes upwards from a top edge portion of a right half part of the light-shielding member 60. The blocking ear 63 is formed on and horizontally protrudes rearwards from a portion of a rear surface of the blocking wall 62 which is adjacent to a left end of the blocking wall 62. The reflective block 64 is formed on and obliquely protrudes downwards and rearwards from the rear surface of the light-shielding member 60, is located below the blocking ear 63, and has a second reflective surface 641. The second reflective surface 641 is concavely formed on a rear surface of the reflective block 64 and faces the first reflective surface 41. The mounting holes 65 are respectively formed through two end portions of the light-shielding member 60, and correspond to the respective third coupling portions 512 of the lens housing 51. Two fasteners are sequentially respectively mounted through the mounting holes 65 and the third coupling portions 512 to fasten the light-shielding member 60 and the lens housing 51 together.

With reference to FIG. 6, the blocking wall 62 and the blocking ear 63 of the light-shielding member 60 are located above the center line CL of the lens 52 and the reflective block 64 is located beneath the center line CL of the lens 52.

To explain how light gets reflected in the projection module of the headlight, with further reference to FIG. 6, as the light-emitting element 22 is located below the center line CL of the lens 52, the connection portion 14 of the base 10 is oblique, and the lighting module 20 is mounted on the connection portion 14, light (light beams represented by letters 'A' to 'G') emitted from the light-emitting elements 22 is irradiated to and reflected by almost all the first reflective surface 41 with one part of the reflected light (light beams originated from 'D' and 'E') directly irradiated to and passing through a lower portion of the lens 52 to illuminate a ground surface below the center line CL of the lens 52 and another part of the reflected light (e.g. light beams originated from 'C') irradiated to and further reflected by the slanted portion 61 of the light-shielding member 60 to illuminate an upper portion above the center line CL of the lens 52.

Figure 7:
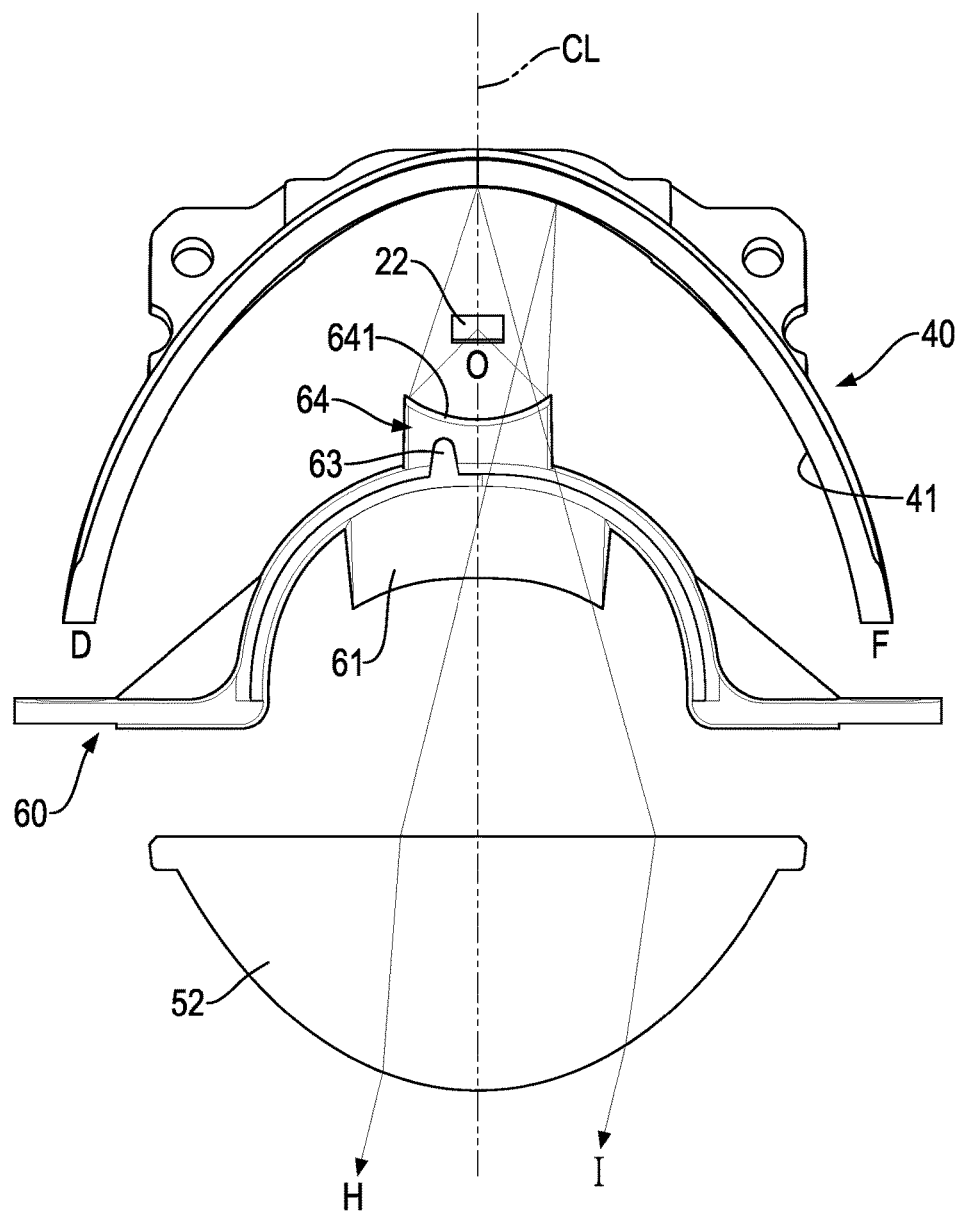
FIG. 7 is a schematic top view showing light transmission of the headlight in FIG. 1.
Figure 8:
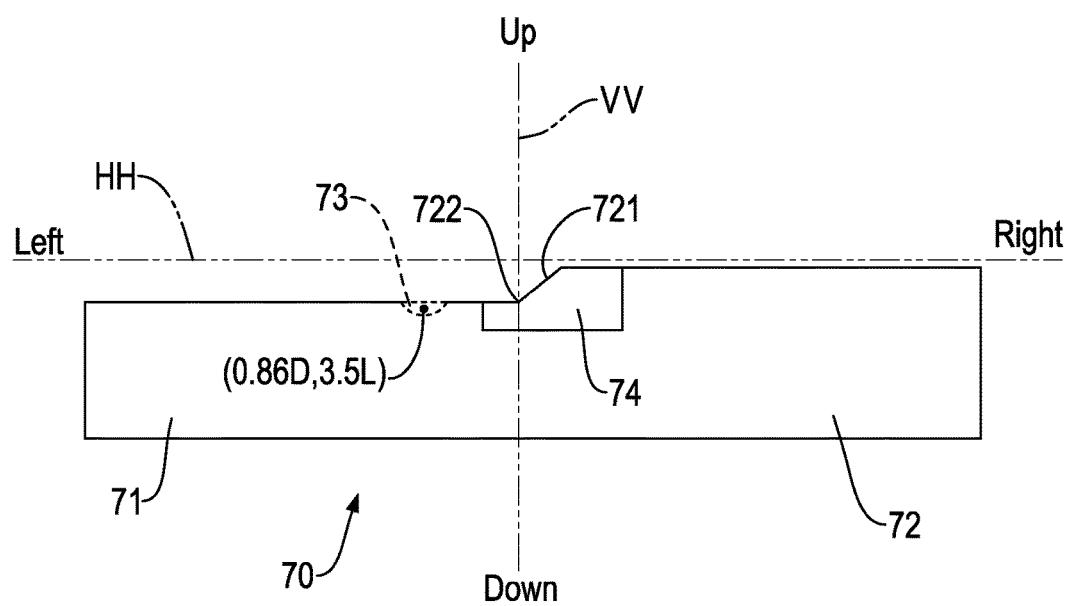
FIG. 8 is a schematic view showing an illumination pattern in accordance with the present invention.
Figure 9:
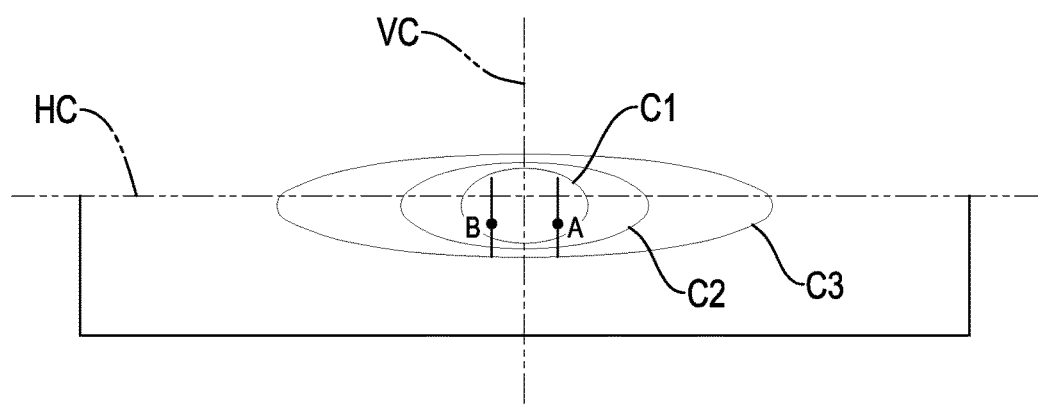
FIG. 9 is a schematic view showing an illumination pattern of conventional headlights.
Figure 10:
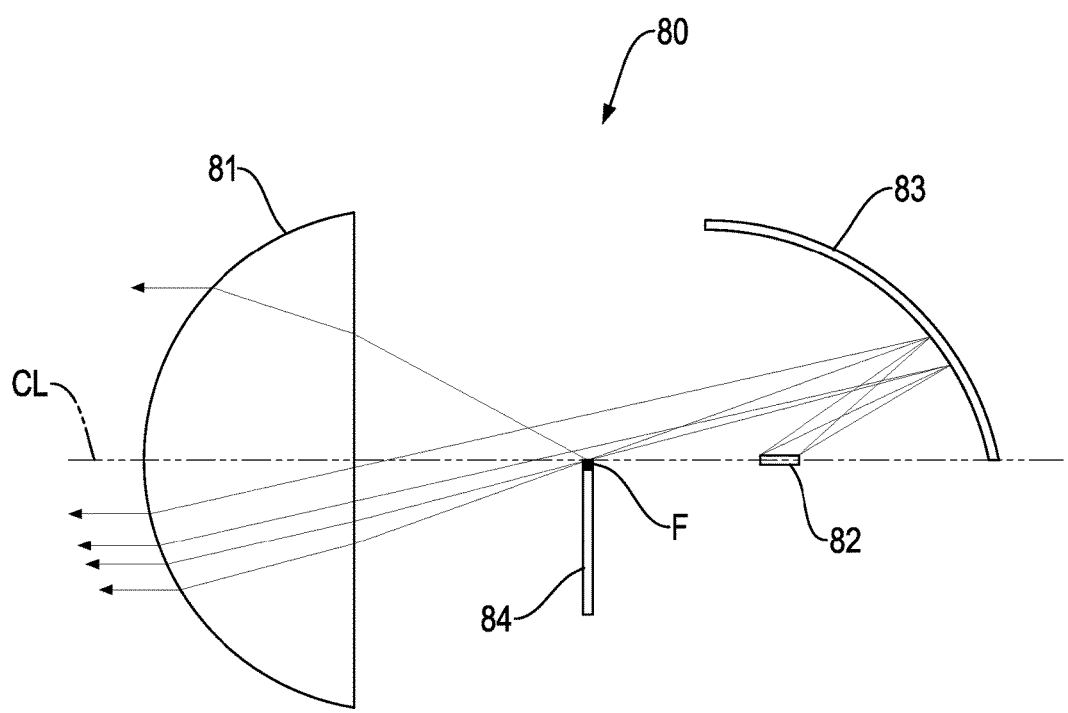
FIG. 10 is a schematic view showing light transmission inside a first conventional headlight.
Figure 11:
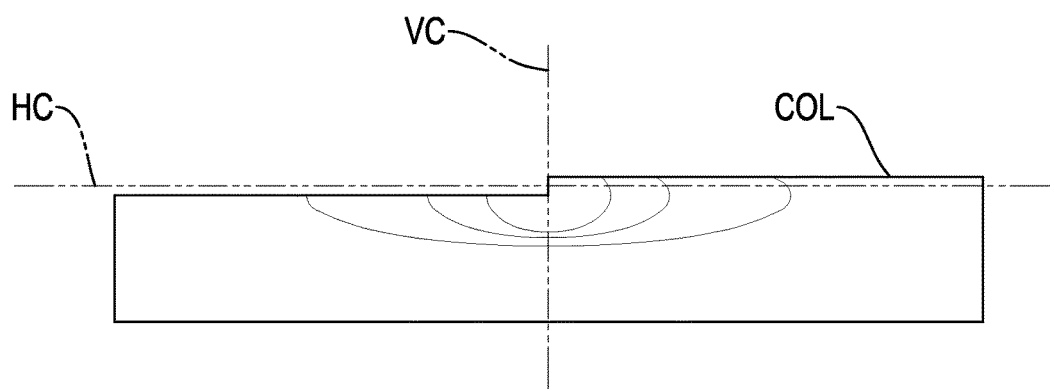
FIG. 11 is a schematic view showing an illumination pattern of the first conventional headlight in FIG. 8.
Figure 12:
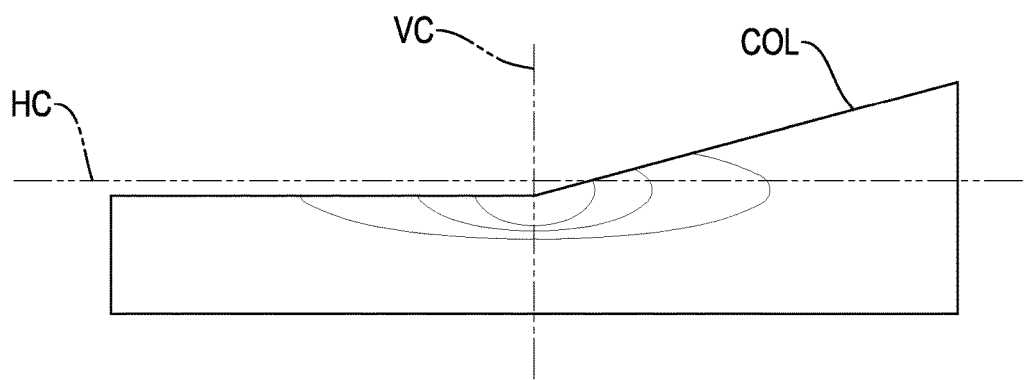
FIG. 12 is a schematic view showing an illumination pattern of a second conventional headlight.
Figure 13:
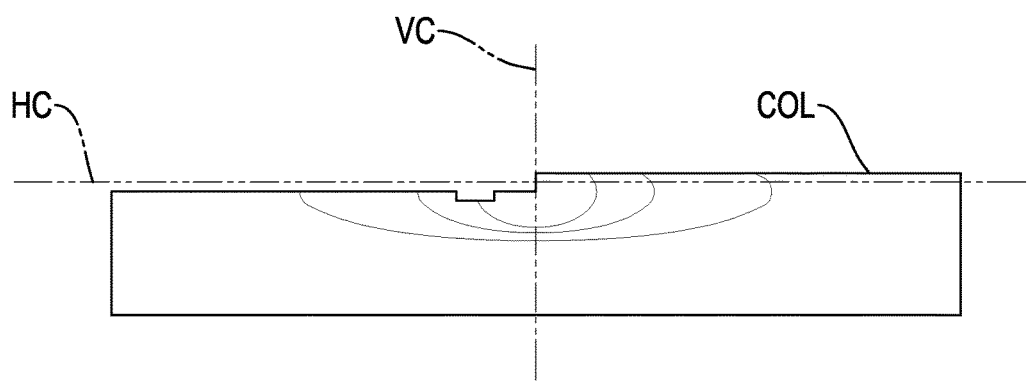
FIG. 13 is a schematic view showing an illumination pattern of a third conventional headlight.

The light passing through the lens 52 forms an illumination pattern 70 associated with the lower beam of the headlight as shown in FIG. 8. The illumination pattern 70 includes a left half pattern 71 and a right half pattern 72 located below a horizontal plane HH and divided by a vertical plane VV, in which the horizontal plane HH and the vertical plane VV perpendicularly intersect in the center line CL. With references to FIGS. 6 to 8, as the lens 52 reverses transmission directions of light beams (e.g. light beams represented by letters 'H' and 'I') passing through the lens 52 and a part of light is blocked by the blocking wall 62 of the light-shielding member 60, the left half pattern 71 is lower than the right half pattern 72 of the illumination pattern 70 as shown in FIG. 8. Moreover, a part of light (e.g. light beam represented by 'G') that originally irradiates to pass through the lens 52 and illuminate a passing-beam dimming zone 73 where is located in the left half pattern 71 of the illumination pattern 70 with a center of the passing-beam dimming zone 73 0.86 degrees below a horizontal plane HH and 3.5 degrees on the left of the vertical plane VV associated with American passing beam requirements for right hand traffic or 0.86 degrees below the horizontal plane HH and 3.43 degrees on the left of the vertical plane VV associated with European passing beam requirements for right hand traffic, is blocked by the blocking ear 62 (see the dotted light beam plotted as the part of the light beam 'G' blocked) to result in less amount of light reaching the passing-beam dimming zone 73, such that the passing-beam dimming zone 73 of the illumination pattern 70 has a reduced luminous intensity lessening the effect of glare generated by the lower beam of the headlight and heading toward the left half zone 71 of the illumination pattern 70 for not visually affecting the driver of the oncoming car, so as to meet America and European passing beam requirements for right hand traffic.

In the present embodiment, a left top portion 721 of the right half pattern 72 of the illumination pattern 70 that obliquely ascends from an intersected portion 722 between the vertical plane VV and a top portion of the left half pattern 71 of illumination pattern 70 to approach to the horizontal plane HH is formed because of light reflected by a bevel surface 621 of the blocking wall 62 and irradiated to the lens 52, so as to shine on road signs on the right side of the vehicle. An inclination angle included between the bevel surface 621 and the top edge portion of the right half part of the light-shielding member 60 can be changed to alter the form of the raised portion of the illumination pattern 70. Additionally, because a part of light (e.g. dashed light beams represented by 'A' and 'B') that is emitted from the light-emitting element 22 and irradiates to the second reflective surface 641 of the reflective block 64 can be sequentially reflected by the second reflective surface 641 and the first reflective surface 41 of the reflective cover 40, and the reflected light further passes through the lens 52 to irradiate to a brightened region 74 of the illumination pattern 70. The brightened region 74 stretches across the vertical plane VV, and has a left part and a right part separated by the vertical plane VV. The left part of the brightened region 74 is located on the left of the vertical plane VV, extends downwards from the top portion of the left half pattern 71 and leftwards from the vertical plane VV, and is spaced apart from the passing-beam dimming zone 73 by a gap. The right part of the brightened region 74 extends rightwards from the vertical plane VV with a left top portion thereof coinciding to the left top portion 721 of the right half pattern 72 of the illumination pattern 70. Accordingly, the luminous intensity of the brightened region 74 can be increased because more amount of light can reach the brightened region 74. Since the reflective block 64 is integrally formed on the light-shielding member 60, the luminous intensity of the brightened region 74 of the illumination pattern 70 can be increased to attain effective utilization of light source and enhanced driving safety at no extra cost for additional element.

In the present embodiment, a first distance L1 is between the lens 52 of the lens assembly 50 and the light-shielding member 60, a second distance L2 is between the light-shielding member 60 and the light-emitting element 22, and a distance ratio of the first distance L1 to the second distance L2 is 3:1. In view of limited space available for design of headlight, the distance ratio allows the first heat-dissipating portion 11 and the second heat-dissipating portion 12 to be designed with a larger size rendering effective heat dissipation.

Furthermore, since the light-shielding member 60 is located at the focal point F of the lens 52 and the second distance L2 between the light-emitting element 22 and the light-shielding member 60 is less than the first distance L1 between the lens 52 and the light-shielding member 60 (or the focal distance of the lens 52), a distance between the light-emitting element 22 and where light emitted from the light-emitting element 22 gets reflected by the first reflective surface 41 of the reflective cover 40 is relatively shorter. As a result of the relatively shorter distance for light reflection between the light-emitting element 22 and the first reflective surface 41, light reflected by the first reflective surface 41 can converge to the focal point in a more concentrated manner with a smaller angle of divergence. Hence, light emitted from the light-emitting element 22 can be effectively utilized to enhance illumination intensity of the headlight.

As the base 10, the lighting module 20, the support frame 30, the reflective cover 40, the lens assembly 50 and the light-shielding member 60 can be assembled through threaded connection to form a modular and assemblable structure of the headlight, the projection module mainly combined by the reflective cover 40, the lens 52 of the lens assembly 50 and the light-shielding member 60 can be tailored to different safety regulations and illumination requirements for convenient and fast assembly and replacement.

In sum, for the sake of the light-emitting element 22 mounted under the center line CL of the lens 52 and mounted on the slanted connection portion 14 of the base 10, large portion of the first reflective surface 41 can be utilized to reflect light emitted from the light-emitting element 22 to the lens 52 to enhance illumination intensity of the headlight.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A headlight with a modular projection module for enhancing illumination intensity, comprising:
    a base having a connection portion formed on and protruding obliquely downwards and rearwards from a middle portion of the base;
    a lighting module mounted on a top of the connection portion of the base;
    a support frame mounted on a front portion of the base and having an opening formed through the support frame;
    a reflective cover mounted on the top of the connection portion of the base with a front portion of the reflective cover mounted through the opening of the support frame, and having a first reflective surface concavely formed on an inner wall of the reflective cover and facing the lighting module;
    a lens assembly mounted on a front portion of the support frame and having a center line centrally passing through the lens assembly, wherein the center line is an optical axis of the lens and the lighting module is located below the center line of the lens assembly; and
    a light-shielding member mounted between the lens assembly and the support frame and having:
        a blocking wall formed on and protruding upwards from a top edge portion of a right half part of the light-shielding member, and located above the center line;
        a blocking ear formed on and horizontally protruding rearwards from a portion of a rear surface of the blocking wall which is adjacent to a left end of the blocking wall, and located above the center line; and
        a reflective block formed on and obliquely protruding downwards and rearwards from the rear surface of the light-shielding member, located below the blocking ear, and having a second reflective surface concavely formed on a rear portion of the reflective block and facing the first reflective surface of the reflective cover;
    wherein a vertical plane and a horizontal plane perpendicularly intersect in the center line, light emitted from the lighting module is reflected by the reflective cover, is partially blocked and partially reflected by the light-shielding member, and passes through the lens assembly to generate an illumination pattern associated with lower beam for right hand traffic, wherein
    the illumination pattern includes:
        a left half pattern and a right half pattern located below the horizontal plane and divided by the vertical plane, wherein the left half pattern is lower than the right half pattern;
        a passing-beam dimming zone located in the left half pattern, and defined to be an area 0.86 degrees below the horizontal plane and 3.5 degrees to the left of the vertical plane, wherein a part of light emitted from the lighting module and irradiating to the blocking ear is blocked by the blocking ear of the light-shielding member to prevent the part of light from further irradiating to the lens assembly and cause a reduced luminous intensity at the passing-beam dimming zone;
        a brightened region stretching across the vertical plane and divided by the vertical plane to have:
            a left part located on the left of the vertical plane, extending downwards from a top edge portion of the left half pattern and leftwards from the vertical plane, and spaced apart from the passing-beam dimming zone by a gap; and
            a right part of the brightened region extending rightwards from the vertical plane with a left top portion thereof coinciding to a left top portion of the right half pattern of the illumination pattern;
        wherein a part of light emitted from the lighting module and irradiating to the second reflective surface of the reflective block is sequentially reflected by the second reflective surface and the first reflective surface of the reflective cover and the reflected light further irradiates to pass through the lens to cause an increased luminous intensity at the brightened region.

2. The headlight as claimed in claim 1, wherein
the connection portion of the base has multiple threaded holes formed in the top of the connection portion; and
the lighting module has:
    a substrate having two through holes formed through the substrate to correspond to the respective threaded holes of the connection portion of the base, wherein two fasteners are respectively sequentially mounted through the through holes of the substrate and the corresponding threaded holes of the connection portion to fasten the substrate on the connection portion of the base; and
    a light-emitting element.

3. The headlight as claimed in claim 2, wherein
the base has two first coupling portions formed on and protruding outwards from a left side and a right side of the connection portion, wherein each first coupling portion has multiple threaded holes formed therein;
the support frame has multiple bordering holes formed through an edge portion around the opening with two of the multiple bordering holes corresponding to one of the threaded holes formed in one of the first coupling portions of the base and one of the threaded holes formed in the other first coupling portion of the base, wherein two fasteners are sequentially mounted through the two bordering holes and the corresponding threaded holes on the first coupling portions to fasten the support frame on the base.

4. The headlight as claimed in claim 3, wherein the reflective cover further has two second coupling portions formed in a rear edge portion of the reflective cover and corresponding to two of the multiple threaded holes on the top of the connection portion of the base, wherein two fasteners are respectively sequentially mounted through the two second coupling portions and the two corresponding threaded holes on the connection portion to fasten the reflective cover on the base.

5. The headlight as claimed in claim 2, wherein the substrate is made of an aluminum material.

6. The headlight as claimed in claim 2, wherein a first distance is between the lens assembly and the light-shielding member, a second distance is between the light-shielding member and the light-emitting element, and a distance ratio of the first distance to the second distance is 3:1.

7. The headlight as claimed in claim 1, wherein
the lens assembly includes a lens housing having two third coupling portions formed on a left portion and a right portion of a periphery of the lens housing; and
the light-shielding member has two mounting holes respectively formed through two end portions of the light-shielding member and corresponding to the two respective third coupling portions of the lens housing, wherein two fasteners are sequentially respectively mounted through the corresponding mounting holes of the light-shielding member and the third coupling portions of the lens housing to fasten the light-shielding member and the lens housing together.

8. The headlight as claimed in claim 7, wherein the lens assembly further includes two fourth coupling portions formed on and protruding rearwards from rear portions of the respective third coupling portions, and corresponding to a rightmost one of the bordering holes and a leftmost one of the bordering holes on a bottom edge portion of the support frame and a rightmost one of the threaded holes and a leftmost one of the threaded holes on the first coupling portion, wherein two fasteners are sequentially respectively mounted through the two fourth coupling portions, the corresponding bordering holes of the support frame and the corresponding threaded holes of the first coupling portion of the base to fasten the lens assembly, the support frame and the base together.

9. The headlight as claimed in claim 8, wherein
the lens housing further has two fifth coupling portions formed on a top portion of the lens housing;
the reflective cover has two sixth coupling portions formed on a top portion of the reflective cover;
wherein the fifth coupling portions of the lens housing correspond to two of the bordering holes on a top edge portion of the support frame and the sixth coupling portions of the reflective cover respectively, and two fasteners are sequentially respectively mounted through the fifth coupling portions, the corresponding bordering holes and the sixth coupling portions to fasten the lens assembly, the reflective cover and the support frame together.

10. The headlight as claimed in claim 1, wherein the light-shielding member further has a slanted portion formed on and obliquely protruding forwards and downwards from a central portion of a front surface of the light-shielding member.

11. The headlight as claimed in claim 1, wherein the base includes a first heat-dissipating portion formed on a rear portion of the connection portion, having multiple fins formed thereon and arranged at spaced intervals, and made of an aluminum material.

12. The headlight as claimed in claim 1, wherein the base includes a second heat-dissipating portion formed on a front portion of the connection portion, having multiple fins formed thereon and arranged at spaced intervals, and made of an aluminum material.

\* \* \* \* \*